July 1, 1969 R. F. GASIK 3,453,405

INERTIA SWITCHES

Filed Sept. 14, 1966

INVENTOR.
RONALD F. GASIK

BY
Morgan, Finnegan, Durham & Pine
ATTORNEYS.

United States Patent Office 3,453,405
Patented July 1, 1969

3,453,405
INERTIA SWITCHES
Ronald F. Gasik, Northridge, Calif., assignor to The Ansul Company, Marinette, Wis., a corporation of Wisconsin
Filed Sept. 14, 1966, Ser. No. 579,263
Int. Cl. H01h 35/02
U.S. Cl. 200—61.45      5 Claims

ABSTRACT OF THE DISCLOSURE

An inertia switch including a spherical contact within a chamber, the spherical contact being resiliently urged toward a connical seat.

---

This invention relates to inertia switches.

Inertia switches are acceleration responsive devices that either open or close a set of electrical contacts when the applied acceleration or deceleration exceeds a predetermined magnitude and are classified primarily in accordance with the response axes or planes. The switch can be unidirectional so that it responds only when accelerated in a single direction, or it can be bidirectional and responsive to acceleration in either of two opposite directions. Inertia switches can also have a planar response so they become activated when accelerated in any direction within a given plane, or they can be omnidirectional and responsive to acceleration in any direction. One further classification of inertia switches are those of the hemispherical type which are responsive to acceleration in any direction throughout a solid angle of 180 degrees.

Inertia switches are responsive to acceleration forces created by vibration in addition to steady and shock type accelerations. If the switch is to have a predetermined sensitivity level with respect to vibrational accelerations, resonant conditions must be avoided since an applied vibration at the resonant frequency of the switch tends to cumulate thereby amplifying itself and causing the switch to actuate at abnormally low vibration levels.

Thus, an object of this invention is to provide an inertia switch substantially without vibrational resonance.

Another object is to provide a hemispherical inertia switch which can be constructed easily and inexpensively to provide acceleration response throughout a solid angle of approximately 180 degrees.

Still another object is to provide an inertia switch responsive both to constant and shock type accelerations.

The inertia switch in accordance with this invention includes a movable contact member in the shape of a sphere or ball that is resiliently urged toward a conical seat. When the inertia switch is accelerated in certain directions, the movable contact member, because of its inertia, is driven against the resilient force and out of the conical seat into contact with the walls of a surrounding chamber. The inertia switch is in the activated state whenever in contact with the surrounding walls of the chamber.

The foregoing and other objects will become apparent from the following specification setting forth an illustrative embodiment of the invention. The drawings form part of this specification wherein.

Figure 1:
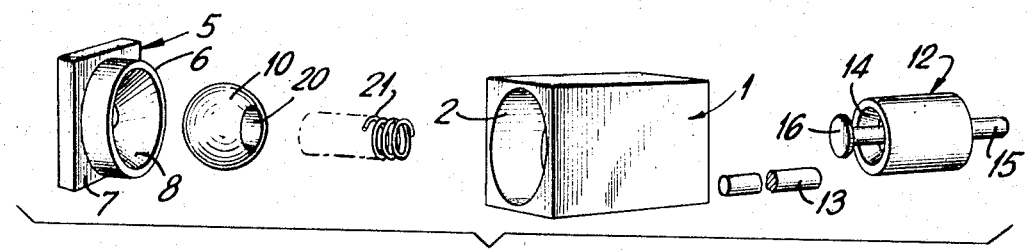
FIGURE 1 is a perspective assembly drawing of the inertia switch.

The inertia switch includes a case 1 constructed from an electrically conductive material such as brass. A generally cylindrical opening passes through the center of case 1 and includes a larger diameter portion 2 at one end and a lesser diameter portion 3 at the other end, these portions of the central opening being joined by a sloping conical surface 4. A ground lead 13 is electrically secured to case 1 at some suitable location.

An end cap 5 is dimensioned to fit on one end of case 1 and includes a cylindrical projection 6 extending from a base 7, base 7 having the same external configuration as case 1. The end cap is constructed from a suitable dielectric material and is dimensioned to force fit within the larger diameter portion 2 of the central opening in case 1. A conical recess 8 is centered within cylindrical projection 6 and extends into end cap 5 to provide a conical seat for an associated spherical or ball shaped contact member 10. The diameter of cylindrical projection 6 is slightly greater than the diameter of spherical contact member 10. The contact member is constructed from an electrically conductive material.

A dielectrical spring retaining member 12 is force fit into the lesser diameter portion 3 of the central opening within case 1 and in the completed assembly is flush with the end of the case. The spring retaining member includes a central frusto conical opening 14 at one end communicating with a smaller diameter opening which passes through the remainder of the spring retaining member. An electrical lead 15 passes through the smaller diameter portion of the opening and is soldered or welded to a flat conductive contact disc 16 which sits at the base of frusto conical opening 14.

The spherical contact member has a hole 20 drilled therein of a proper diameter for holding a metallic spring 21. The other end of the spring lies within frusto conical opening 14 of the spring retaining member and rests against contact disc 16.

The inertia switch is conveniently assembly by first placing the spring 21 within the hole 20 of the spherical contact member. These units are then placed within the central opening of case 1 with the spherical contact member within the larger diameter portion and the spring extending through the smaller diameter portion. The end cap is then force fit into position to close one end of the case to complete a chamber 23 surrounding the movable contact member. The portion of case 1 within the chamber, that is, a portion of cylindrical surface 2 of the larger diameter portion of the central opening, and the conical surface 4 provide the electrical contact surfaces within the chamber. Lead 15 is passed through the center of the spring retaining member and thereafter soldered or welded to contact disc 16. The lead is then pulled back so that contact disc 16 rests at the base of the frusto conical opening 14. Thereafter spring retaining member 12 is force fit into the lesser diameter portion of the opening in case 1. When the spring retaining member is properly positioned, spring 21 is partially compressed between contact disc 16 and spherical contact member 10 and therefore the spring urges the contact member into conical seat 8. In the rest condition, the inertia switch appears as shown in FIGURE 2.

Figure 3:
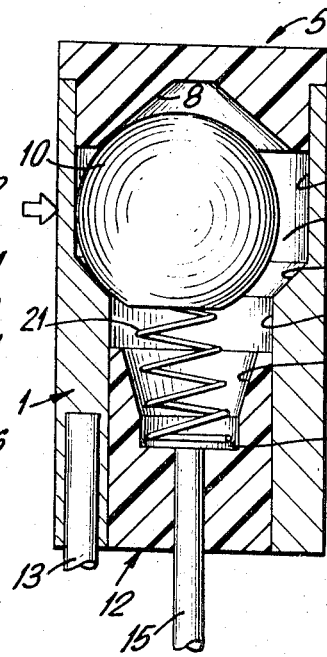
FIGURE 3 is a cross sectional view of the inertia switch when accelerated in a horizontal or lateral direction.
Figure 4:
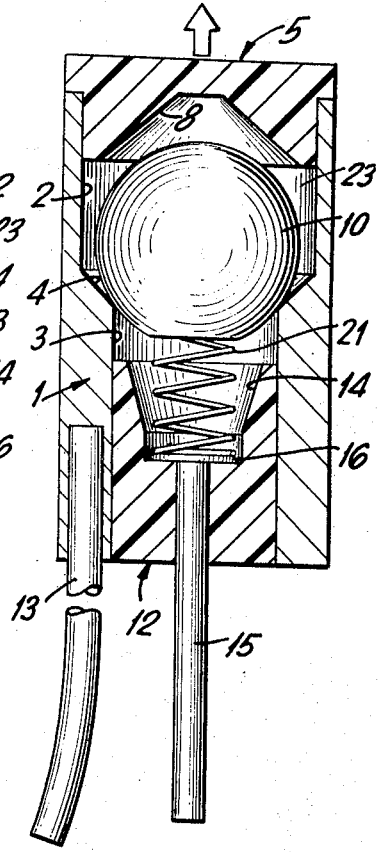
FIGURE 4 is a cross sectional view of the inertia switch when accelerated in an upward direction.

Contact member 10, spring 21, case 1, end cap 5 and spring retaining member 12 all have a common central axis which is used as a directional reference. An acceleration in the upward direction as shown in FIGURE 4 is at zero degrees and acceleration in a downward direction as shown in FIGURE 2 is at 180 degrees. Acceleration in a horizontal or side wise direction as illustrated in FIGURE 3 is at 90 degrees.

Figure 2:
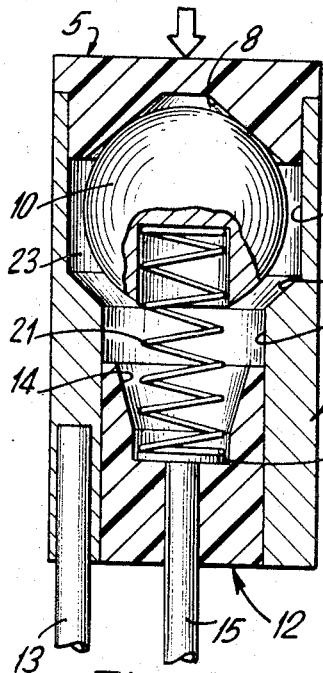
FIGURE 2 is a cross sectional view of the inertia switch when in the rest position or when accelerated in a downward direction.

When the inertia switch is accelerated downwardly as shown in FIGURE 2, the inertia of the spherical contact tends to drive the contact member into the conical seat. The contact member 10 does not engage any of the surrounding contact surfaces 2 or 4. When the switch is accelerated in the opposite direction, i.e., in the zero degree direction as shown in FIGURE 4, the spring is compressed as the inertia drives the contact member into engagement with the conical shoulder or surface 4. Accordingly, an electrical circuit is completed from lead 15 through disc 16, spring 21, contact member 10, and case 1 to ground lead 13. An acceleration in the horizontal or 90 degree direction as shown in FIGURE 3 causes the contact member to slide out of its conical seat into engagement with the cylindrical contact surface 2 to likewise complete the electrical circuit between leads 13 and 15.

Figure 5:
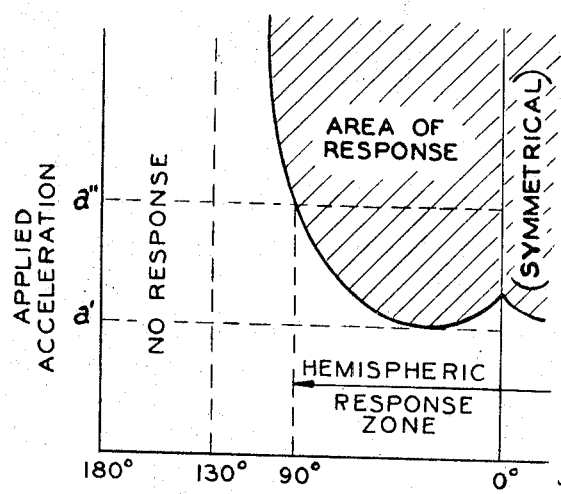
FIGURE 5 is a diagram illustrating the response characteristics of the inertia switch.

The response characteristic for the inertia switch is illustrated in FIGURE 5. The switch is actuated by an acceleration which exceeds a value ($a'$) when applied at approximately the 35 degree direction, i.e. upwards and side wise. Somewhat greater acceleration is required to close the switch as the zero and 90 degree directions are approached. Beyond the 90 degree direction, or in other words, outside the hemispherical response area, the acceleration required to close the contacts increases very rapidly. At directions greater than 130 degrees response is impossible since the contact member would be driven further into its conical seat and away from the surrounding contact surfaces.

Accordingly, the inertia switch in accordance with this invention will not become actuated in response to any acceleration of a magnitude less than $a'$ regardless of the applied direction. There is essentially no response to acceleration outside the hemispherical response zone (beyond 90 degrees) except for some slight response to accelerations greater than $a''$ in the area close to 90 degrees. If an acceleration is between $a'$ and $a''$ or greater and is applied within the hemispherical response zone (0–90 degrees) the inertia switch is activated and the contacts are closed to complete an electrical circuit. The switch has been found to provide similar response characteristics under shock conditions and constant acceleration conditions.

Units constructed as illustrated in FIGURES 1–4 have been found relatively insensitive to vibration. The switch was without pronounced resonant characteristics. Furthermore, the switch could not be actuated by vibrational acceleration forces of less than one half of $a'$, and hence, for the majority of installation the switch can be classified as insensitive to vibrational forces.

The inertia switches can be quite small. For example, case 1 can have dimension on the order of ¼" x ¼" x ½", the associated components being dimensioned accordingly.

While only one embodiment of the invention has been described in detail it should be obvious that there are numerous variations within the scope of the invention. For example, the illustrated inertia switch is of the normally open type, but could be converted to a normally closed type by utilization of a non-conductive case 1 and a conductive conical seat 5. Also, the structure can be modified to achieve other than hemispherical response characteristics. The invention is more particularly defined in the appended claims.

What is claimed is:
1. An inertia switch comprising:
   an electrically conductive spherical movable contact member;
   first means defining a seat for said contact member when at rest;
   second means defining walls of a chamber, said chamber including said movable spherical contact member therein;
   one of said first and second means being electrically conductive and the other being nonconductive; and
   spring means for resiliently coupling said movable contact member to said second means for urging said movable contact member toward said seat for maintaining said movable contact member separated from said walls of said chamber under rest conditions and to permit movement of said movable contact member into engagement with said walls when said switch is subjected to accelerations in certain directions.
2. An inertia switch in accordance with claim 1 wherein said seat comprises a generally conical depression.
3. An inertia switch in accordance with claim 1 wherein said spring means is conductive and completes the electrical circuit through said contact member and the conductive one of said first and second means when said accelerations are applied.
4. A hemispherical inertia switch comprising:
   an electrically conductive spherical movable contact;
   a nonconductive member defining a conically shaped seat for said movable contact, the base diameter of said conically shaped seat being slightly greater than the diameter of said spherical contact;
   an electrically conductive stationary contact surrounding said nonconductive member and providing a chamber including said spherical contact therein;
   conductive resilient means electrically insulated from said stationary contact and attached to said movable contact for urging said movable contact in the direction of the apex of said conically shaped seat.
5. An inertia switch in accordance with claim 4 wherein said stationary contact includes an annular inwardly projecting shoulder for providing a contact surface for said movable contact when forced directly away from said conical seat.

References Cited

UNITED STATES PATENTS 2,415,086    2/1947    Detwiler _____ 200—61.45
2,983,800    5/1961    Rabinow _____ 200—61.45

ROBERT K. SCHAEFER, *Primary Examiner.*

M. GINSBURG, *Assistant Examiner.*